United States Patent
Savunen

(10) Patent No.: US 7,411,922 B1
(45) Date of Patent: Aug. 12, 2008

(54) PACKET DATA SERVICE IN A MOBILE COMMUNICATIONS SYSTEM

(75) Inventor: Tapio Savunen, Helsinki (FI)

(73) Assignee: Eads Secure Networks Oy, Helsinki (FI)

( * ) Notice: Subject to any disclaimer, the term of this patent is extended or adjusted under 35 U.S.C. 154(b) by 890 days.

(21) Appl. No.: 10/111,169

(22) PCT Filed: Oct. 18, 2000

(86) PCT No.: PCT/FI00/00905

§ 371 (c)(1),
(2), (4) Date: Jul. 17, 2002

(87) PCT Pub. No.: WO01/30092

PCT Pub. Date: Apr. 26, 2001

(30) Foreign Application Priority Data

Oct. 22, 1999 (FI) .................................. 19992297

(51) Int. Cl.
*H04Q 7/00* (2006.01)
*H04Q 7/24* (2006.01)
*H04L 12/66* (2006.01)

(52) U.S. Cl. .................. 370/328; 370/338; 370/352

(58) Field of Classification Search .............. 370/379, 370/352; 455/445
See application file for complete search history.

(56) References Cited

U.S. PATENT DOCUMENTS

| | | | |
|---|---|---|---|
| 5,970,059 A | | 10/1999 | Ahopelto et al. |
| 6,061,346 A | * | 5/2000 | Nordman .................. 370/352 |
| 6,104,929 A | * | 8/2000 | Josse et al. ................ 455/445 |
| 6,320,873 B1 | * | 11/2001 | Nevo et al. ................ 370/466 |
| 6,469,998 B1 | * | 10/2002 | Burgaleta Salinas et al. ................... 370/338 |
| 6,608,832 B2 | * | 8/2003 | Forslow .................... 370/353 |
| 6,904,025 B1 | * | 6/2005 | Madour et al. ............. 370/328 |

FOREIGN PATENT DOCUMENTS

| | | |
|---|---|---|
| WO | WO 98/59468 | 12/1998 |
| WO | WO 99/16266 | 4/1999 |
| WO | WO 00/14981 | 3/2000 |

OTHER PUBLICATIONS

GPRS Tunneling Protocol, ETSI EN GSM 09.60 V6.8.1 release 1997.*
"General GPRS Architecture and Transmission Mechanism," GSM 03.60 version 6.3.2 Release 1997, Chapter 5, pp. 14-26, EN 301 344 V6.3.2 (Jul. 1999).

* cited by examiner

*Primary Examiner*—Daniel J Ryman
(74) *Attorney, Agent, or Firm*—Barnes & Thornburg LLP

(57) ABSTRACT

A switching and management infrastructure of a mobile communications network is connected to a gateway node by a standard interface initially defined to be used in an other packet-mode communication network, in order to provide a packet-mode connection to an external communication network. As a consequence, the protocols and signaling messages already defined and developed for this standard interface can be used for activating, deactivating and updating a logical packet data context between the infrastructure and the gateway packet node as well as to tunnel data packets therebetween. Also standard gateway packet node and all the existing interworking function thereof can be used for providing packet data services and interworking for the mobile network. Thereby the need for developing and defining a special packet data routing and interworking for the mobile network will be avoided or minimized. On the other hand, the packet data services and protocols as well as the mobility management already developed for the switching and management infrastructure can be utilized.

12 Claims, 3 Drawing Sheets

US 7,411,922 B1

PACKET DATA SERVICE IN A MOBILE COMMUNICATIONS SYSTEM

This is a National Stage application of International Application No. PCT/FI00/00905, which was filed on Oct. 18, 2000, and designated the U.S. and was published in the english language.

FIELD OF THE INVENTION

The invention relates to packet-mode transmission in a mobile communications system.

BACKGROUND OF THE INVENTION

Mobile communications systems refer generally to any tele-communications system which enables a wireless communication when users are moving within the service area of the system. A typical mobile communications system is a public land mobile network (PLMN). Often the mobile communications network is an access network providing a user with a wireless access to external networks, hosts, or services offered by specific service providers.

TETRA (TErrestrial Trunked RAdio) is a standard defined by ETSI (European Telecommunications Standard Institute) for digital professional mobile radio or private mobile radio (PMR) systems. The TETRA system is developed primarily for professional and governmental users, such as police, military forces, oil plants, etc.

One of the main targets in the development of mobile communications networks is to provide new data communication services, such as packet data communication, and especially IP (Internet protocol) services. Therefore, a new TETRA packet data protocol (PDP) is under standardization in ETSI. The TETRA PDP will extend the conventional TETRA network to work as an IP subnet.

The TETRA PDP extends data communication services by providing increased capacity and usability for the TETRA. TETRA packet data is built on top of the basic TETRA radio link protocol stack and provides service mechanisms to convey different higher layer protocols. The network layer protocols supported by the TETRA PDP include Internet Protocol (IP) versions 4 and 6. Thus the TETRA packet data extends the TETRA network to act as an IP subnet in the mobile IP scheme, which enables application programmers to build their applications in a well standardized environment.

In the draft specifications there are defined only two reference points for the TETRA PDP. These reference points are between an IP packet mode equipment (TE) and a mobile termination (MT) and between MT and TETRA Switching and Management Infrastructure (SwMI), respectively. In other words, the draft specifications of ETSI define how TETRA PDP operates from the point of view of the air interface and how to connect an IP packet-mode terminal equipment TE (e.g. PC or laptop) to a TETRA mobile terminal MT. No reference points inside the SwMI nor between the SwMI and an external IP network have been defined. In other words, the draft ETSI specifications do not define how to connect the TETRA PDP to the external IP networks which accommodate the IP services the user is interested in. As a consequence, the internal structure of the SwMI and its interworking with external IP networks is dependent on implementation.

In this context the interconnectivity of the TETRA PDP can be divided into three parts: 1) Interworking with external IP Networks, e.g. the Internet and private intranets; 2) Interworking between separate TETRA networks; and 3) Interworking between the TETRA PDP and other mobile communications networks.

In the interworking between the TETRA PDP and external IP networks, users' requirements for the TETRA PDP may vary a lot. The basic need is naturally the same: a user wants to use IP-based applications located on an external IP network, either on the Internet or on an intranet. From the user's perspective a network which resides between a user terminal and application services is merely a transport media for IP datagrams. However, even if the basic functionality is the same, the way the connection is established and packets are routed from one network to another varies.

When the PDP context is established (i.e. the subscriber's IP address is activated and data can be transferred), the following issues may vary among users: 1) Allocation of the IP address (e.g. whether a static or dynamic allocation is used, and whether the IP address is allocated from the operator's or customer's address space); 2) User authentication (e.g. the authentication method used, whether the authentication is carried out by the operator and/or the customer); 3) User authorization; 4) Encryption of the IP traffic (none, end-to-end encryption, encryption between inteworking networks); and 5) Tunneling of the traffic.

The routing needs may also be very different for different users:

i) All IP packets from the mobile stations MS of a TETRA customer are routed to the customer's intranet, regardless of the IP destination address in the packets. In this case the customer's intranet provides all the IP services which the users want to use, for example access to the Internet is provided through the customer's own network. Possible solutions include tunneling protocols, such as the GRE, L2TP and IPSEC tunnel mode. Specific IP routing techniques may also be used, such as MPLS.

ii) All IP packets from the mobile station of the TETRA customer are routed to the Internet through the TETRA operator's Internet gateway. In this case there is no direct connection from the TETRA operators's network to its customer's intranet but all IP packets from the MSs are routed to the Internet. This means that the TETRA operator works as an Internet Service Provider (ISP).

iii) The TETRA operator provides IP-based services on their own IP network. In this case the operator has IP services on their own network and provides them for the TETRA customers. Such services could include e-mail, WAP services and services tailored for the customers.

iv) The remaining needs may be combinations of the basic schemes described above. In this case the TETRA operator's customer uses services provided on several IP networks. For example, there are important services on the customer's own intranet, the TETRA operator provides some specific IP services on its own network, and Internet access is routed through the TETRA operator's Internet gateway.

The IP interworking between TETRA networks should provide the TETRA subscribers with the possibility to use TETRA PDP services in multiple SwMIs, i.e. TETRA networks. For example, a user should be able to activate the PDP context for IP traffic in a home SwMI and then visit a foreign SwMI and continue using IP services without any additional arrangements.

At present there are no implemented solutions fulfilling the interworking needs described above.

DISCLOSURE OF THE INVENTION

An object of the present invention is to improve the interconnectability of a packet data access network to other networks.

The object is achieved by a method and a network characterized by what is disclosed in the attached independent claims. Preferred embodiments of the invention are disclosed in the attached dependent claims.

The basic idea of the present invention is to connect a switching and management infrastructure of a mobile communications network to a packet node by means of a standard interface initially defined to be used in an other packet mode communication network, in order to provide a packet-mode connection to an external communication network. As a consequence, the protocols and signaling messages already defined and developed for this standard interface can be used for activating, deactivating and updating a logical packet data context between the infrastructure and a gateway packet node as well as to tunnel data packets therebetween. Also a standard gateway packet node and all the existing interworking functions thereof can be used for providing packet data services and interworking in the mobile network. Thereby the need for developing and defining separate packet data routing and interworking in the mobile network will be avoided or minimized. On the other hand, the packet data services and protocols as well as the mobility management already developed for the switching and management infrastructure can be utilized.

In the preferred embodiment of the invention the Gn interface of the GPRS is used as an interface between a TETRA switching and management infrastructure and a gateway GPRS support node (GGSN). The GGSN is responsible for interworking with external networks, such as packet data networks (PDN), GPRS networks, the universal mobile telecommunication system (UMTS), or with another TETRA network. The invention enables to use TETRA mobility management (MM) and TETRA home database (HDB) and TETRA visitor database (VDB) functions, instead of GPRS mobility management and HLR and VLR functions. The use of the Gn interface and the GGSN allows to utilize standard building blocks of the mobile packet data world and the mainstream wireless data implementations (GSM, GPRS) for many features, instead of implementing them within the TETRA switching and management infrastructure. The present invention also provides access to the GGSN development path, since all the development of the GGSN made in the GPRS can be easily adopted to the TETRA system.

Further, the Gp interface which has been defined between the SGSN and the GGSNs in the GPRS can be used for interworking between the GGSNs in separate TETRA PLMNs so that packet data can be tunneled from one TETRA network to another.

BRIEF DESCRIPTION OF THE DRAWINGS

In the following, the invention will be described in greater detail by means of preferred embodiments with reference to the accompanying drawings, in which.

PREFERRED EMBODIMENTS OF THE INVENTION

Preferred embodiments of the invention will be described in the following as implemented in a TETRA network using the Gn interface of the GPRS for interconnection to other networks, but the invention is not restricted to this concept.

Firstly, the TETRA PDP architecture and the GPRS architecture according to the current ETSI specifications are illustrated, in order to facilitate the description of the invention.

The TETRA PDP Architecture

The basic TETRA network architecture is called a Switching and Management Infrastructure (SwMI). The SwMI includes all equipment and means which enable the users to communicate with each other via the SwMI. It should be noted that the exact structure and operation of the SwMI is not relevant to the invention. Generally, the SwMI may be any mobile network infrastructure which provides switching and mobility management functions. The TETRA network architecture implemented by Nokia Inc, Finland, comprises digital exchanges DXT to which base stations BTS are connected. The TETRA utilizes a distributed subscriber database structure including a home database (HDB) which comprises permanent information about the individual and/or group subscribers in the subscriber's home network, and a visitor database (VDB) which comprises temporary information about individual and/or group subscribers visiting the network. Each DXT is typically provided with a VDB. Some of the DXTs provide a gateway to other telecommunications networks.

The SwMI communicates over an air interface $R_0$ with a TETRA mobile termination MT or a mobile station MS. The MT is connected to a terminal equipment TE through an interface R1. Further, an intersystem interface (ISI) is defined in the TETRA standard for interconnecting different TETRA networks.

Figure 1:
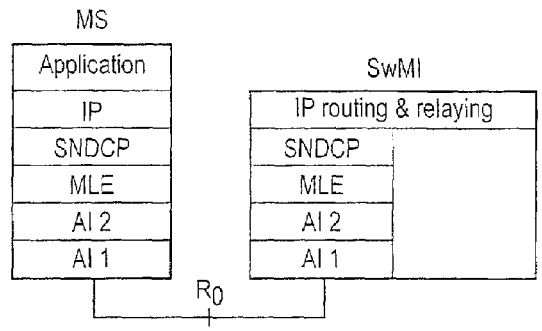
FIG. 1 illustrates the transmission plane of the TETRA PDP.

The TETRA PDP extends the data communication services by providing increased capacity and usability for the TETRA. The present scenario of the TETRA PDP is disclosed in ETS 300 392-2 clause 19 version ME Aug. 4, 1999, which is incorporated herein as a reference. FIG. 1 illustrates the protocol stacks of the TETRA packet data when an application using the IP protocol is located in a mobile station MS. The MS may be, for example, a combination of an IP packet mode Terminal Equipment (TE), such as a Personal Computer (PC), and a TETRA Mobile Termination (MT) having an IP packet data support. The protocol stacks in the MS and the SwMI typically contain the following protocols: Subnetwork Dependent Convergence Protocol (SNDCP), Mobile Link Entity (MLE), Logical Link Control (LLC), Medium Access Control (MAC), and Air Interface Layer 1 (Al-1).

The air interface layer 1 (Al-1) is defined in the TETRA specifications and provides a physical TETRA channel over the air interface Ro. The MAC controls the access signaling (request and grant) procedures of the radio channel, and the mapping of the LLC frames onto the TETRA physical channel. Logical Link Control (LLC) layer provides a logical link between the MS and the SwMI. The MLE protocol discriminator entity (data transfer) routes TETRA packet data signaling and data to the corresponding TETRA Packet data service access point (SAP) at the peer entity (SwMI/MS).

The TETRA packet data is built on top of the MLE layer of the basic TETRA protocol stack and provides service mechanisms to convey different higher layer protocols. The first protocol, introduced merely for the packet data service, is the SNDCP. The SNDCP is a TETRA-specific network layer protocol that has two main functions: 1) to negotiate and maintain TETRA PDP contexts between the MS and the SwMI, and 2) to control the PDP data transfer between the MS and the SWMI.

Before the MS can gain access to any of the SNDCP services, it goes first through a packet data registration procedure called PDP Context Activation. The PDP Context Activation is initiated by the MS. In the PDP Context Activation, a PDP address (e.g. an IPv4 address) and other parameters to be used during data transfer are negotiated, as well as the binding of the PDP address to a TETRA subscriber identity ITSI. A unique PDP context is established for each PDP address which is active on the network (i.e. ready to transmit or receive data). In addition to the PDP address and the ITSI, the PDP context includes an SNDCP service access point identifier (SN-SAP), or, more generally, an NSAPI (Network Service Access Point Identifier) through which the services of the SNDCP are available to the upper layer protocols. Two TETRA PDP contexts stored in the MS and the SwMI establish a logical connection therebetween.

In FIG. 1 the application in the MS uses the IP protocol layer which is on top of the SNDCP layer. In the SwMI there is an IP routing and relaying layer. Although other protocols of the $R_0$ (and the R1) interface are well defined in the TETRA specifications, the implementation of the IP routing and relaying layer in the SwMI as well as the connection to external networks are outside the scope of the ETSI specifications.

The GPRS Architecture

The GPRS infrastructure according to the GPRS specifications comprises GPRS support nodes (GSNs), namely a GPRS gateway support node (GGSN) and a GPRS serving support node (SGSN). The main functions of the SGSN are to detect new GPRS mobile stations in its service area, handle the process of registering the new MSs together with the GPRS registers, send/receive data packets to/from the GPRS MS, and keep a record of the location of the MSs within its service area. The subscription information is stored in a GPRS register (HLR) where the mapping between the mobile's identity (such as MS-ISDN or IMSI) and the PDP address is stored. The GPRS register acts as a database from which the SGSNs can ask whether a new MS in its area is allowed to join the GPRS network. The SGSNs and GGSNs within one PLMN are interconnected by an intra-operator backbone network which can be implemented, for example, by means of a local area network, such as an IP network. The interface between the SGSNs and GGSNs within one PLMN is the Gn interface defined in the ETSI/GSM 09.60 technical specification. The protocol between the GSN nodes in the GPRS backbone network at the Gn interface within one PLMN and at the Gp interface (the interface between the GSNs of different PLMNs) is called the GPRS Tunneling Protocol (GTP). The GTP allows multiprotocol packets to be tunneled through the GPRS backbone between the GSNs.

The main functions of the GPRS gateway support node (GGSN) involve interaction with the external data network. The GGSN interconnects an operator's GPRS network to external systems, such as other operators' GPRS systems, data networks, such as an IP network (Internet) or an X.25 network, and service centers. The GGSN includes GPRS subscribers' PDP addresses and routing information, i.e. SGSN addresses. Routing information is used for GTP tunneling of the protocol data units (PDUs) from the external network to the current access point of the MS, i.e. to the serving SGSN.

In order to access the GPRS services, the MS shall first make its presence known to the network by performing a GPRS attach. This operation establishes a logical link between the MS and the SGSN, and makes the MS available for SMS over the GPRS, paging via the SGSN, and notification of incoming GPRS data. More particularly, when the MS attaches to the GPRS network, i.e. it performs the GPRS attach procedure, the SGSN creates a mobility management context (MM context), and a logical link LLC (Logical Link Control) is established between the MS and the SGSN in the protocol layer. The MM contexts are stored in the SGSN and the MS. The MM context of the SGSN may contain subscriber data, such as the subscriber's IMSI (International Mobile Subscriber Identity), TLLI, and location and routing information, etc.

In order to send and receive GPRS data, the MS shall activate the packet data address it wants to use by requesting a PDP activation procedure. This operation makes the MS known in the corresponding GGSN, and interworking with external data networks can commence. More particularly, one or more PDP contexts are created in the MS, the GGSN and the SGSN, and stored in the serving SGSN in connection with the MM context. The PDP context defines different data transmission parameters, such as PDP type (e.g. X.25 or IP), PDP address (e.g. IP address), quality of service QoS and NSAPI (Network Service Access Point Identifier). Two associated PDP contexts in different GSN nodes define a GTP tunnel. The tunnel is identified with a Tunnel ID (TID) which consists of the IMSI and the NSAPI. The MS activates the PDU context with a specific message, Activate PDP Context Request, in which it gives information on the TLLI, PDP type, PDP address, required QoS and NSAPI, and, optionally the access point name APN. The SGSN sends a create PDP context message to the GGSN, which creates the PDP context and sends it to the SGSN. The SGSN sends the PDP context to the MS in an Activate PDP Context Response message, and a virtual connection or link between the MS and the GGSN is established. As a result, the SGSN forwards all the data packets from the MS to the GGSN, and the GGSN forwards to the SGSN all data packets received form the external network and addressed to the MS. The PDP context is stored in the MS, the SGSN and the GGSN. When the MS roams to the area of a new SGSN, the new SGSN requests the MM and PDP contexts from the old SGSN.

The TETRA PDP having the Gn Interface and the GGSN

Figure 2:
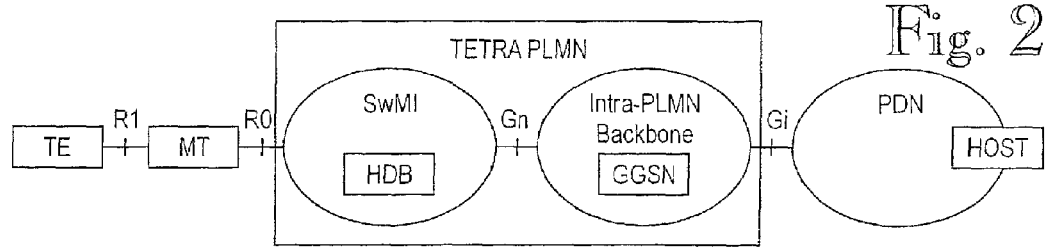
FIG. 2 illustrates the architecture of the TETRA PDP using the GGSN.

The system architecture according the preferred embodiment of the invention is illustrated in FIG. 2. A basic TETRA network employing packet data protocol is interconnected to other packet data networks (PDN), an external host, or to other communications networks by means of the Gn interface and the GPRS gateway support node (GGSN) of the General Packet Radio Service (GPRS).

In FIG. 2 the GGSN is located in a private IP network called an Intra-PLMN Backbone. The combination of the SwMI and the Intra-PLMN Backbone is called a TETRA PLMN. The whole TETRA PLMN is usually controlled by one TETRA operator. The SwMI and the Intra-PLMN Backbone are interconnected with the Gn interface defined in the ETSI GPRS specifications. However, the SGSN and the mobility management features of the GPRS are not utilized in the TETRA PLMN according to the invention. This approach enables to use TETRA Mobility Management (MM) and TETRA Home DataBase (HDB) and Visitor Database functions instead of the GPRS MM, HLR and VLR functions. Thus, no new or modified mobility features are required in the TETRA SwMI. On the other hand, the standard GPRS GGSN can be used for interconnecting the TETRA PDP to other networks instead of implementing these with TETRA specific solutions within the TETRA network. This results in significantly lower costs and less development and standardization work. All future development in the GPRS can be immediately introduced into the TETRA PDP. The minimum requirement in the TETRA SwMI is that the IP routing and relaying layer is modified to support, at least in some extent, the Gn interface and to adapt it to the TETRA PDP.

Thus, the main functions of the SwMI may include the standard functions of the TETRA SwMI, namely network access control, mobility management, radio resource management, base station functions, and HDBNDB functions, as well as the functionality which provides the Gn interface for the GGSN. The GGSN, on the other hand, provides the interworking with external IP networks, such as IP address allocation, IP routing, IP user authentication, IP tunneling, and IP encryption.

The legends in FIG. 2 have the following meanings:

TETRA PLMN: A TETRA network which is a combination of a TETRA SwMI and an Intra-PLMN Backbone.

SWMI: A TETRA Switching and Management Infrastructure.

HDB: A database which comprises information about the individual and/or group subscribers and is located in the subscriber's home SwMI.

GGSN: A Gateway GPRS Support Node.

Intra-PLMN Backbone: A private IP network interconnecting IP network nodes, such as GGSNs.

PDN: An IP Packet Data Network, such as the Internet or a private intranet.

Host: An IP host computer, such as an e-mail server or an ordinary PC.

R1: The TETRA reference point between the packet mode TE and the MT.

R0: The reference point on the TETRA air interface for IP packet data.

Gn, here: The reference point between the SwMI and the GGSN within the same TETRA PLMN.

Gi, here: The reference point between an Intra-PLMN Backbone and an external IP PDN.

Figure 3:
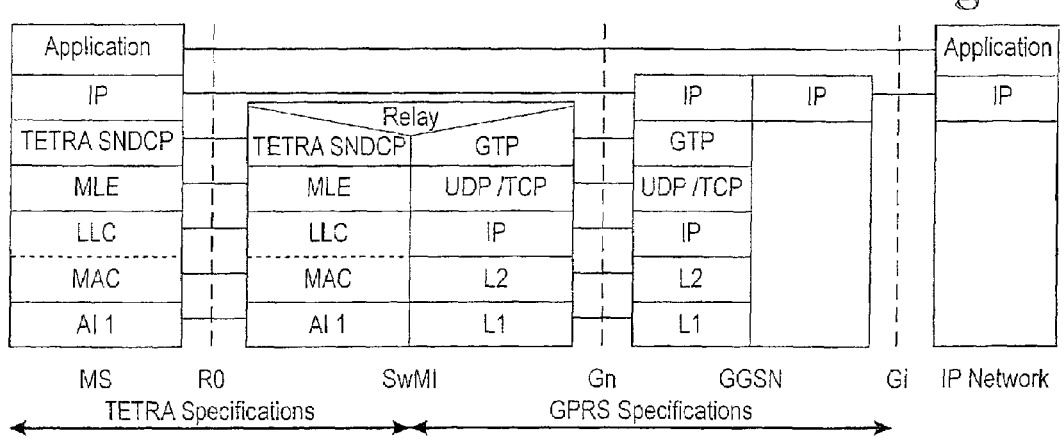
FIG. 3 illustrates the transmission plane of the TETRA PDP using the GGSN.

FIG. 3 illustrates the transmission and signaling planes between the TETRA PDP and the GGSN. The protocol structure is a combination of the transmission planes described in the TETRA and GPRS specifications. The connection is generated by a relay function in the SwMI, which relays PDP PDUs between the Ro and Gn interfaces.

The TETRA protocol stacks were described above with reference to FIG. 1. In the Gn interface the GPRS Tunneling Protocol (GTP) tunnels the the user data and the signaling messages between the SwMI and the GGSN. The User Datagram Protocol (UDP) and the Transmission Control Protocol (TCP) are alternative protocols which can be used with the underlying IP layer to transfer GTP signaling between the SwMI and the GGSN. Layer 1 (L1) and Layer 2 (L2) are physical and data link layers at the bottom of the protocol stack.

The GTP protocol across the Gn interface is defined in the ETSI GSM 09.60 technical specification. However, only some of the signaling messages defined for the GPRS are necessarily required for the GTP signaling between the SwMI and the GGSN in the TETRA system of FIGS. 2 and 3. It seems to be necessary to support at least the following GTP signaling messages: Create PDP Context Request, Create PDP Context Response, Update PDP Context Request, Update PDP Context Response, Delete PDP Context Request and Delete PDP Context Response. Also the following messages should preferably be supported: Echo Request, Echo Response, Version Not Supported and Error Indication.

In the following, examples of the PDP context activation and deactivation procedures utilizing standard TETRA PDP and GPRS signaling messages will be described.

PDP Context Activation Procedure

Figure 4:
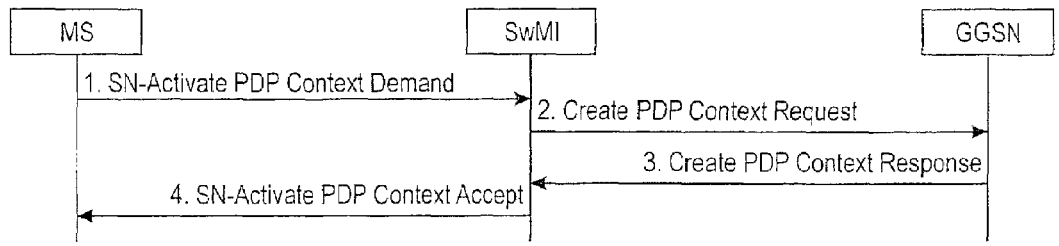
FIG. 4 is a signaling diagram illustrating a PDP context activation procedure.

A successful PDP Context Activation procedure is illustrated in FIG. 4. Each numbered step is explained in the following list.

1. The MS sends an SN-ACTIVATE PDP CONTEXT DEMAND PDU to the SwMI over the $R_0$ interface as defined in the TETRA PDP specifications. This message is an SNDCP protocol message, which is indicated here with the abbreviation SN. The MS indicates the form of IP address (static or dynamic) it wishes to use in the element 'Address Type Identifier in Demand'.

2. Upon receiving the SN-ACTIVATE PDP CONTEXT DEMAND PDU, the SNDCP entity in the SwMI creates a TETRA PDP context. The SwMI creates a TID (Tunnel Identifier) for the requested PDP context by combining the ITSI with the NSAPI received from the MS. The Access Point Name (APN) for the ITSI is retrieved from the subscriber data in the HDB. The SNDCP layer entity communicates with the GTP layer via the relay layer. The DNS functionality of the Intra-PLMN Backbone is used to translate the APN into the IP address of the GGSN. If the MS requests a dynamic address, then the SwMI lets the GGSN allocate the dynamic address. The SwMI sends a Create PDP Context Request (TID, APN) to the affected GGSN.

3. The GGSN creates a new entry (a PDP context) in its PDP context table and generates a Charging Id. The new entry allows the GGSN to route PDP PDUs between the SwMI and the external PDP network, and to start charging. The GGSN then returns a Create PDP Context Response message to the SwMI. A PDP Address (i.e. the IP address) is included if the GGSN allocated a PDP address.

4. The SwMI inserts the NSAPI along with the GGSN address in its PDP context. As a result, the PDP context is created both in the GGSN and the SwMI, and a virtual connection or GTP tunnel is established therebetween in accordance with specifications of the GPRS Gn interface. The NSAPI and the ITSI links the PDP context to a specific SNDCP entity and TETRA PDP context. The relay function sends a predetermined primitive with the allocated IP address to the SNDCP layer in the SwMI. The SNDCP entity completes the creation of the TETRA PDP context and returns an SN-ACTIVATE PDP CONTEXT ACCEPT PDU to the MS. The respective SNDCP entity in the MS completes the creation of the TETRA PDP entity and indicates the allocated IP address to the IP and the application layers. A logical connection is now established between the MS and the SwMI. The PDUs, e.g. the IP datagrams, can now be transferred from the Ms to the SwMI and further to the GGSN, and similarly in the reverse direction from the GGSN to the MS. The relay function in the SwMI relays the packets between the logical connection legs MS-SwMI and SwMI-GGSN according to the PDP context information, such as TID, NSAPI, ITSI, GGSN address, IP address, etc., depending on the implementation. The SwMI is now able to route PDP PDUs to and from the MS. The GGSN operates towards external networks as defined in the GPRS specifications.

Figure 5:
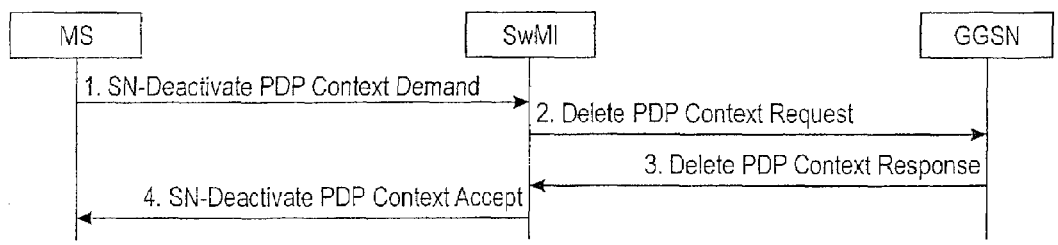
FIG. 5 is a signaling diagram illustrating an MS-originated PDP context deactivation procedure.

In the above example, different PDP contexts are created for the $R_0$ interface and the Gn interface in the SwMI. It is, however, possible to combine these two PDP contexts into one modified PDP context in the SNDCP layer, if desired. In this case the relay layer provides an interconnection between the SNDCP layer and the GTP tunnel. MS-Originated PDP Context Deactivation Procedure An MS-originated PDP Context Deactivation procedure is illustrated in FIG. 5. Each numbered step is explained in the following list.

1. The MS sends an SN-DEACTIVATE PDP CONTEXT DEMAND PDU to the SwMI.

2. The SwMI sends a Delete PDP Context Request message containing the TID to the GGSN.

3. The GGSN removes the PDP context. If the MS was is a dynamic PDP address, then the GGSN releases this PDP address and makes it available for subsequent activation by other MSs. The GGSN returns a Delete PDP Context Response message containing the TID to the SwMI.

4. The SwMI removes the PDP context(s) and returns an SN-DEACTIVATE PDP CONTEXT ACCEPT PDU to the MS.

As a result, the PDP contexts for the $R_0$ and Gn interfaces are deactivated in the MS, SwMI and GGSN.

SwMI-Originated PDP Context Deactivation Procedure

Figure 6:
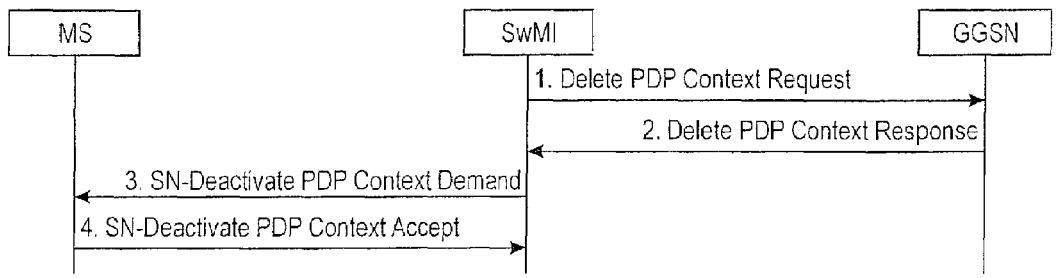
FIG. 6 is a signaling diagram illustrating an SwMI-originated PDP context deactivation procedure.

An SwMi-originated PDP Context Deactivation procedure is illustrated in FIG. 6. Each numbered step is explained in the following list.

1. The SwMI sends a Delete PDP Context Request message containing the TID to the GGSN. The SwMI may send an SN-Deactivate PDP Context Demand PDU before it receives a response from the GGSN.

2. The GGSN removes the PDP context and returns a Delete PDP Context Response message containing the TID to the SwMI. If the MS is using a dynamic PDP address, then the GGSN releases this PDP address and makes it available for subsequent activation by other MSs.

3. The SwMI sends an SN-DEACTIVATE PDP CONTEXT DEMAND PDU to the MS.

4. The MS sends an SN-DEACTIVATE PDP CONTEXT ACCEPT PDU to the SwMI.

As a result, the PDP contexts for the $R_0$ and Gn interfaces are deactivated in the MS, SwMI and GGSN. TETRA Mobility Management As noted above, one of the advantages of the invention is that the TETRA PDP part of the TETRA PLMN shown in FIG. 2 uses the TETRA Mobility Management defined in the TETRA specifications.

On the other hand, the GGSN knows the IP address of the other end of the GTP tunnel for each PDP context, that is, the address of the Gn interface in the SWMI (the SGSN Address field in the GGSN's PDP context). If the SwMI has more that one Gn interface and the active Gn interface changes while the MS roams, the SWMI must signal the corresponding GGSN to update the address of the Gn interface. That can be done by using the GTP signaling message Update PDP Context Request defined in the GPRS specifications. In order to facilitate the description of the location update signaling between the SWMI and the GGSN, a new entity called a Gn Gateway has been defined.

Figure 7:
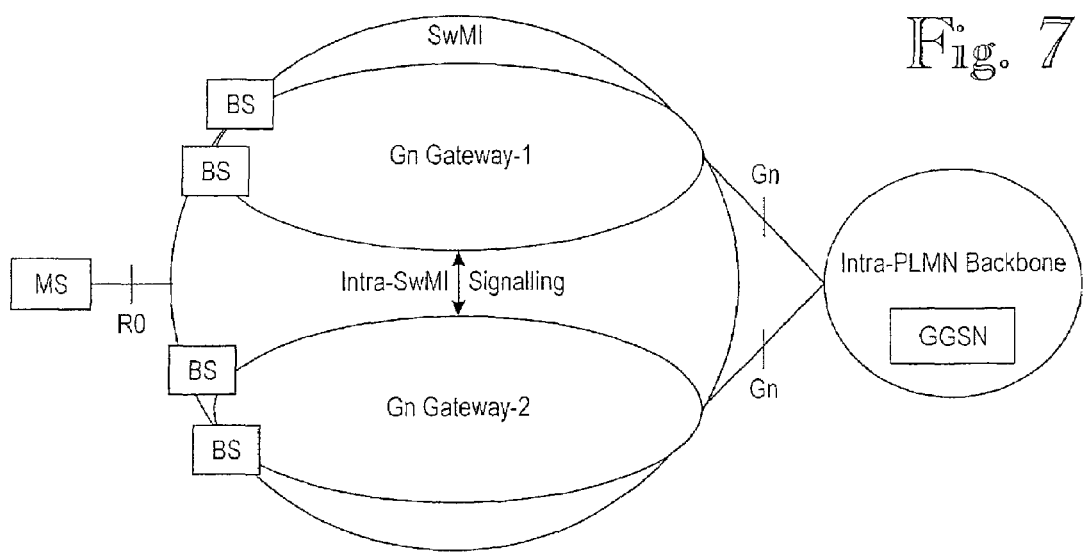
FIG. 7 illustrates an SwMI with two Gn gateways.

The Gn Gateway is located inside the SwMI, and each SwMI may have one or several Gn Gateways. The Gn Gateway participates in the TETRA Mobility Management in various ways. Firstly, each Gn Gataway is responsible for a group of TETRA base stations BS. The number of BSs in a group is dependent on the implementation and configuration concerned. The Gn Gateway has one or more Gn interfaces, that is, IP gateways with the GTP tunnelling support connected to the Intra-PLMN backbone. The Gn Gateway is responsible for routing T-PDUs (TETRA Payload Tunneled over the GTP tunnel) between its Gn interface and the TBSs it is responsible for. When the MS roams from the area of one Gn Gateway to the area of another, the new Gn Gateway is responsible for signaling towards the GGSN and for signaling with the old Gn Gateway. The signaling between the Gn Gateway and the GGSN is the GTP signaling, whereas the signaling between two Gn Gateways is intra-SwMI signaling, which is implementation-dependent. A typical implementation of the Gn gateway is to arrange it in association with a TETRA exchange DXT: when a serving DXT changes within the SwMI, also the Gn Gateway entity is changed. An SwMI with two Gn Gateways and two Gn interfaces between the SwMI and the Intra-PLMN backbone is illustrated in FIG. 7.

Inter-Gn Gateway Location Update

Figure 8:
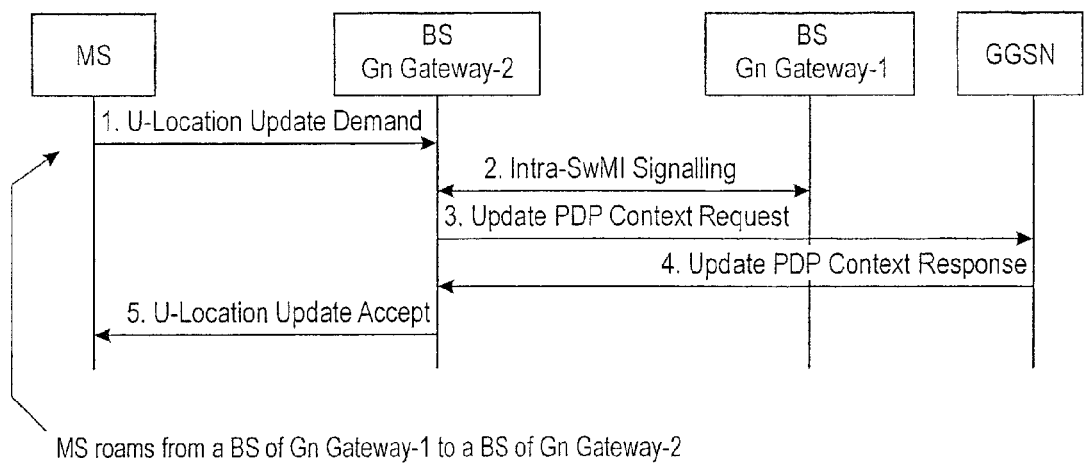
FIG. 8 is a signaling diagram illustrating an inter-Gn gateway location update.

An Inter-Gn Gateway Location Update procedure is illustrated in FIG. 8. Each step is explained in the following list.

1. The MS roams from the area of Gn Gateway-1 to the area of Gn Gateway-2 shown in FIG. 7 and sends a U-LOCATION UPDATE DEMAND PDU to one of the BSs of Gn Gateway-2.

2. An Intra-SwMI signaling between Gn Gateway-1 and Gn-Gateway-2 relating to the mobility management within the TETRA network.

3. After completing the change of the Gn-Gateway within the SwMI, the new Gn Gateway-2 sends an Update PDP Context Request containing the IP address for the Gn interface of Gn Gateway-2 and the TID to the GGSN.

4. The GGSN updates its PDP context fields with the new Gn address and the TID and returns an Update PDP Context Response containing the TID.

5. Finally, the BS of Gn Gateway-2 sends a U-LOCATION UPDATE ACCEPT PDU to the MS.

As a result, data transfer between the MS and the GGSN can continue through the new Gn Gateway.

Interworking between Separate TETRA Networks

Figure 9:
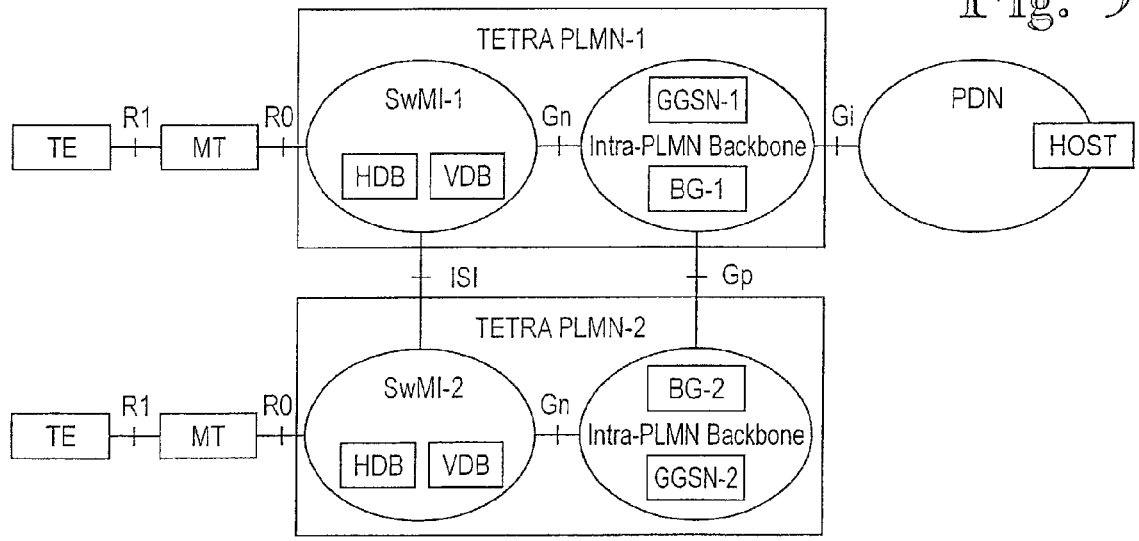
FIG. 9 illustrates IP interworking between separate TETRA PLMNs.

The TETRA PLMN architecture according to the invention allows also a relatively simple interworking between separate PLMN networks, as illustrated in FIG. 9. TETRA PLMN-1 and TETRA PLMN-2 are both similar to the TETRA PLMN described above with respect to FIG. 2. A visitor database VDB is a database which comprises temporary information about individual and/or group subscribers and is located in the visited SwMI. The SwMIs of the separate networks are interconnected by the Inter-System Interface (ISI) defined in the ETS 300 392-3-1 technical specification. Thus TETRA-related mobility management and interworking can be carried out as defined for the TETRA. The Intra-PLMN Backbones of the separate PLMNS are interconnected, in accordance with the GPRS specifications, by the Gp interface via Border Gateways BG. Therefore, GTP tunnelling and GPRS signaling can be used between the GGSNs in different PLMNs. For example, let us assume, that the MS roams from PLMN-1 to PLMN-2 while having an active connection to the GGSN1. The SwMI-1 and the SwMI will firstly carry out an inter-PLMN handover using the TETRA-specific ISI signaling. At the same time, the Gn Gateway is also changed. The new Gn gateway obtains the GGSN address in the ISI signaling and then sends the Update PDP Context Request (containing the IP address for the Gn interface of the new Gn Gateway and the TID) to the GGSN1 via BG2, Gp interface and BG1. The GGSN1 updates its PDP context fields with the new Gn address and the TID and returns an Update PDP Context Response containing the TID. Thus, a GTP tunnel is established between the SwMI-2 and the GGSN1. No new interfaces or signaling protocols are needed for supporting the mobility and routing in the inter-PLMN roaming.

The Gn interface and the GGSN, which conform to the GPRS specifications, allow interworking with other networks as well, such the UMTS (Universal Mobile Communications System) or the GSM (Global System for Mobile communication) supporting the GPRS operation.

The description only illustrates preferred embodiments of the invention. The invention is not, however, limited to these examples, but it may vary within the scope and spirit of the appended claims.

The invention claimed is:

1. A mobile communications network, comprising
a plurality of mobile stations having a packet data capability,
a trunked radio switching and management infrastructure having a mobility management capability for the mobile stations which have a logical packet data connection of a first type activated between said trunked radio infrastructure and the respective mobile station,
a gateway packet node connected to said trunked radio switching and management infrastructure by means of a standard interface initially defined to be used between packet nodes in another packet radio network in order to provide a packet mode connection to an external communications network,
said trunked radio switching and management infrastructure and the gateway packet node being arranged to activate a logical packet data connection of a second type and to tunnel data packets between the trunked radio infrastructure and the gateway packet node according to protocols and signaling messages defined for said standard interface.

2. A communications network as claimed in claim 1, wherein said trunked radio switching and management infrastructure includes a relaying function which maps the identifiers of said logical connections together.

3. A communications network as claimed in claim 1, wherein
said logical connection of the first type is activated in a network-layer of a protocol stack between the mobile station and the trunked radio switching and management infrastructure,
said logical connection of the second type is activated in a tunneling protocol layer at said standard interface,
said trunked radio switching and management infrastructure includes a relaying function for relaying data packets and adapting the signaling protocols between said logical connections of the first and the second type in order to provide an end-to-end data transfer and end-to-end signaling procedures for activation and deactivation of the logical connections between the mobile station and the gateway packet node.

4. A communications network as claimed in claim 1 or 3, wherein said trunked radio switching and management infrastructure is arranged to derive a subscriber identity or a tunnel identity used at the standard interface protocols from a subscriber identity and/or a logical connection identity used in the trunked radio switching and management infrastructure.

5. A communications network as claimed in claim 1 or 3, wherein said standard interface includes at least a part of a Gn interface.

6. A communications network as claimed in claim 5, wherein said trunked radio switching and management infrastructure supports at least the following tunneling protocol messages in the Gn interface: Create PDP Context Request, Create PDP Context Response, Update PDP Context Request, Update PDP Context Response, Delete PDP Context Request and Delete PDP Context Response.

7. A communications network as claimed in claim 6, wherein said trunked radio switching and management infrastructure further supports the following tunneling protocol messages in the Gn interface: Echo Request, Echo Response, Version Not Supported and Error Indication.

8. A communications network as claimed in claim 1 or 3, wherein said trunked radio switching and management infrastructure comprises two or more internal gateway entities each having said standard interface to said gateway packet node, and wherein said trunked radio switching and management infrastructure is arranged to change the internal gateway entity by means of an internal signaling and mobility management when a mobile station roams within the trunked radio infrastructure, and wherein the new internal gateway entity is arranged to signal the address of the new gateway entity to said gateway packet node so as to update the logical packet data connection of the second type.

9. A communications network as claimed in claim 3, wherein said relaying function maps the identifiers of said logical connections together.

10. A mobile communications network comprising:
a plurality of mobile stations having a packet data capability,
a switching and management infrastructure having a mobility management capability for the mobile stations which have a logical packet data connection of a first type activated between said infrastructure and the respective mobile station,
a gateway packet node connected to said switching and management infrastructure by means of a standard interface initially defined to be used between packet nodes in a different type of a packet radio network in order to provide a packet mode connection to an external communications network,
said switching and management infrastructure and the gateway packet node being arranged to activate a logical packet data connection of a second type and to tunnel data packets between the infrastructure and the gateway packet node according to protocols and signaling messages defined for said standard interface,
and wherein said switching and management infrastructure further comprises a signaling interface to another switching and management infrastructure in a separate mobile communications network, and wherein said gateway packet node has a second standard interface to another gateway packet node in said separate mobile communications network, said second standard interface being initially defined to be used between gateway packet nodes in said different type of communications network.

11. A method of establishing packet mode communication from a mobile communications network to external communications networks, said mobile communications network comprising a plurality of mobile stations and a trunked radio switching and management infrastructure, said method comprising:
activating a packet protocol context between a mobile station and the trunked radio switching and management infrastructure with a trunked radio infrastructure-specific network-layer protocol,
using the mobility management of the trunked radio switching and management infrastructure for managing the mobility of the mobile station having the packet protocol context,
interconnecting the trunked radio switching and management infrastructure to a gateway packet node by means of a standard interface initially defined to be used between packet nodes in another packet network, using protocols and signaling messages defined for said standard interface, for activating packet data protocol context between the trunked radio switching and management infrastructure and the gateway packet node.

12. A method as claimed in claim 11, wherein said standard interface includes at least a part of a Gn interface.

* * * * *